(No Model.)

L. JULIG & E. EWALD.
EXPLOSIVE ENGINE.

No. 387,167. Patented July 31, 1888.

Witnesses
Geo. H. Strong

Inventors,
Leopold Julig.
Edward Ewald.
By Dewey & Co.
attys

United States Patent Office.

LEOPOLD JULIG AND EDWARD EWALD, OF SAN FRANCISCO, CALIFORNIA.

EXPLOSIVE ENGINE.

SPECIFICATION forming part of Letters Patent No. 387,167, dated July 31, 1888.

Application filed July 27, 1887. Serial No. 245,467. (No model.)

*To all whom it may concern:*

Be it known that we, LEOPOLD JULIG and EDWARD EWALD, of the city and county of San Francisco, State of California, have invented an Improvement in Explosive Engines; and we hereby declare the following to be a full, clear, and exact description of the same.

Our invention relates to the class of motors; and it consists in the construction and combination of devices, which we shall hereinafter fully describe and claim.

Figure 1:
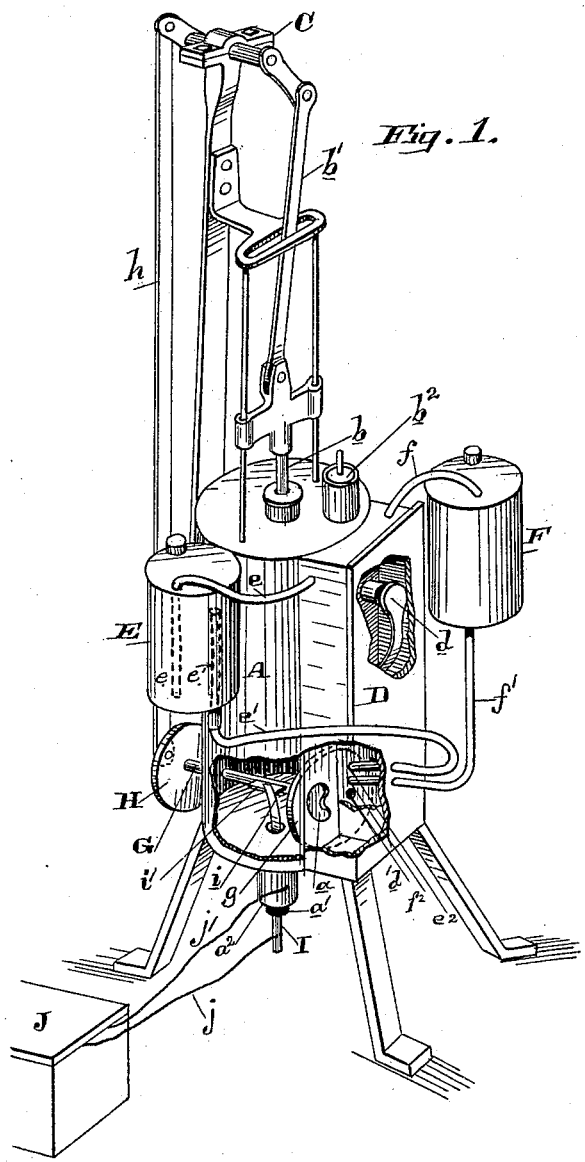
Figure 2:
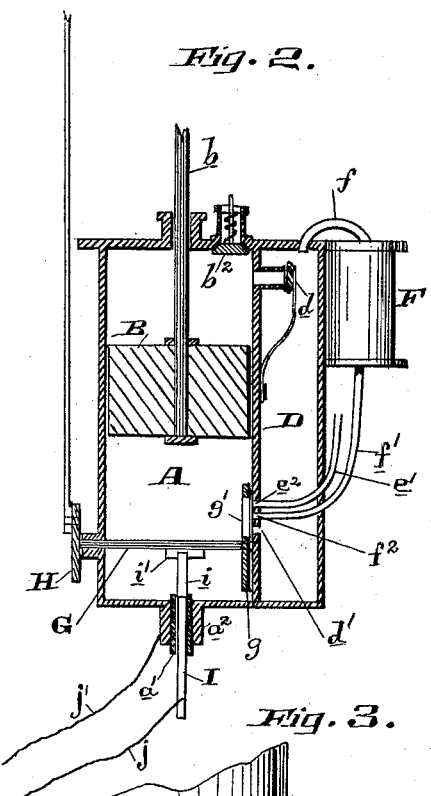
Figure 3:
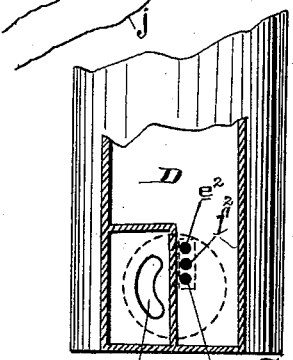

Referring to the accompanying drawings for a more complete explanation of our invention, Figure 1 is a perspective view of our motor, the lower portion of the cylinder, and air-chamber, the side of the latter being broken away. Fig. 2 is a vertical section through the cylinder and air-chamber. Fig. 3 is a section of the air-chamber, showing its ports.

A is a cylinder, in which is fitted and adapted to reciprocate a piston, B, the rod $b$ of which is guided suitably and connected by a pitman, $b'$, with the crank-shaft C. The forward head of the cylinder is provided with an inwardly-opening spring-actuated valve, $b^2$. On the side of the cylinder is an air-chamber, D, which communicates with the upper end of the cylinder through a port controlled by an outwardly-swinging spring-valve, $d$, and with the lower end of the cylinder behind the piston through a port, $d'$, which is controlled by a rotary valve, to be described presently. To the side of the cylinder is secured a vessel, E, for containing oil, into which a pipe, $e$, from the air-chamber is let, and out of which a pipe, $e'$, passes downwardly and communicates with the cylinder behind the piston by a port, $e^2$, controlled by the rotary valve. To the cylinder is also secured a vessel, F, which is to contain some suitable lubricant, such as a saponaceous solution or compound. Into the top of this is let a pipe, $f$, from the air-chamber, and from its bottom extends a pipe, $f'$, which opens into the cylinder behind the piston through a port, $f^2$, which is also controlled by the rotary valve. Mounted transversely in the cylinder behind the piston and behind its limit of stroke is a valve-shaft, G, which carries a disk-valve, $g$, having a port, $g'$, which by its rotation is adapted to come into line with the several ports from the air-chamber, the oil-chamber, and the chamber containing the saponaceous compound, whereby all said ports are simultaneously opened, and to move out of line with them, whereby they are closed. Through the side of the cylinder is made an exhaust-port, $a$, which is also controlled by the rotary disk-valve $g$.

The crank-shaft C is connected by a link, $h$, with a crank-wheel, H, on the end of the valve-shaft, whereby said shaft is rotated and its valve operated. The crank-wheel H may serve also as a fly-wheel. Passing through an insulated piece, $a'$, in a tube, $a^2$, in the bottom of the cylinder is a wire, I, the upper end of which is provided with a sparking-spring, $i$, the inner end of which lies in the rotary path of a small rib or projection, $i'$, on the rotary valve-shaft G, whereby an intermittent electric spark is provided for.

J is a battery, from which a wire, $j$, extends to the wire I, and a wire, $j'$, extends to and is suitably connected with the tube $a^2$ of the metal cylinder, thereby establishing the circuit for effecting the electric spark.

The operation of the motor is as follows: As the piston moves back or descends in the cylinder it draws air in through the top valve, $b^2$, and as the piston moves forward or up the said valve closes and the air is forced out of the cylinder into the air-chamber D through the valve $d$. From said air-chamber a portion of the air passes directly to the port $d'$, which admits it to the cylinder behind the piston. Another portion of the air is forced into the oil-vessel E and becomes carbureted therein, and carries gases with it down through the pipe $e$ and into the cylinder behind the piston. The remaining portion of the air passes into the vessel F, containing the saponaceous solution, and forces a portion of it down through the pipe $f$ and into the cylinder behind the piston, said solution being for the purpose of acting as a lubricant, it not being possible to use oil for this purpose on account of the electric spark. It will therefore be seen that the air passing into the vessel E is discharged therein down near the bottom of the body of oil, and as it rises through said oil it becomes carbureted and passes out through the discharge-pipe near the top of the vessel.

The air, the gas, and the lubricant all enter the cylinder behind the piston through their several ports, being admitted by the rotary disk-valve *g* in the cylinder. The gas is ignited by the electric spark, and the heat thus produced heats and thereby expands the air, and has a tendency, also, to convert a portion of the water into steam, so that by means of the expanded air, assisted by the steam, the piston is driven on its up or forward stroke, its return-stroke being effected by momentum or gravity.

The exhaust from behind the piston takes place through the port *a*, and the rotation of the valve-shaft continues the intermittent action of the electric spark, so that the operation proceeds as before.

Having thus described our invention, what we claim as new, and desire to secure by Letters Patent, is—

In a motor, a valved cylinder, a piston reciprocating therein, and a crank-shaft with which the piston is connected, in combination with an air-chamber communicating with the cylinder in front of the piston, said communication being controlled by a valve and with the cylinder behind the piston, a vessel containing oil communicating with the air-chamber and the cylinder behind the piston, a vessel containing a lubricant communicating with the air-chamber and with the cylinder behind the piston, an exhaust from the cylinder behind the piston, a rotary ported valve within the cylinder controlling the communication of the air-chamber, the oil-vessel, and the lubricant-vessel with the cylinder, and also controlling the exhaust, a shaft by which the valve is rotated and a connection between the crank-shaft and said shaft, and an electrical sparking apparatus comprising a contact-spring within the cylinder, a rib or piece on the rotating valve-shaft coming in contact with the spring, and an electric circuit including said shaft and spring, all arranged and adapted to operate substantially as herein described.

In witness whereof we have hereunto set our hands.

LEOPOLD JULIG.
EDWARD EWALD.

Witnesses:
LEE D. CRAIG,
S. H. NOURSE.